United States Patent
Kaushik et al.

(10) Patent No.: US 10,558,450 B2
(45) Date of Patent: Feb. 11, 2020

(54) MECHANISM FOR CUSTOMIZING MULTIPLE COMPUTING DEVICES

(71) Applicant: Wyse Technology L.L.C., Santa Clara, CA (US)

(72) Inventors: Puneet Kaushik, Fremont, CA (US); Salil Joshi, Fremont, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 87 days.

(21) Appl. No.: 15/426,578

(22) Filed: Feb. 7, 2017

(65) Prior Publication Data
US 2018/0225105 A1    Aug. 9, 2018

(51) Int. Cl.
*G06F 9/44* (2018.01)
*G06F 8/65* (2018.01)
*G06F 9/445* (2018.01)
*G06F 16/23* (2019.01)

(52) U.S. Cl.
CPC ............ *G06F 8/65* (2013.01); *G06F 9/44505* (2013.01); *G06F 16/235* (2019.01)

(58) Field of Classification Search
CPC ........... G06F 8/65; G06F 8/71; G06F 9/44536
See application file for complete search history.

(56) References Cited

U.S. PATENT DOCUMENTS

| | | | | |
|---|---|---|---|---|
| 9,280,338 B1* | 3/2016 | Stickle | ................ | G06F 9/44536 |
| 2005/0210459 A1* | 9/2005 | Henderson | ................ | G06F 8/65 |
| | | | | 717/168 |
| 2005/0240921 A1* | 10/2005 | Barker | ...................... | G06F 8/61 |
| | | | | 717/175 |
| 2006/0037012 A1* | 2/2006 | Zomaya | .................... | G06F 8/64 |
| | | | | 717/168 |
| 2006/0253849 A1* | 11/2006 | Avram | .................... | G06F 9/445 |
| | | | | 717/172 |
| 2007/0156788 A1* | 7/2007 | Wray | .................. | G06F 21/6209 |
| 2007/0169103 A1* | 7/2007 | Bhatkhande | .............. | G06F 8/71 |
| | | | | 717/170 |
| 2011/0246982 A1* | 10/2011 | Wookey | .................. | G06F 8/658 |
| | | | | 717/175 |
| 2012/0197972 A1* | 8/2012 | Tukol | .................. | G06F 9/44505 |
| | | | | 709/203 |
| 2013/0211546 A1* | 8/2013 | Lawson | ............. | G05B 19/4185 |
| | | | | 700/9 |
| 2013/0275958 A1* | 10/2013 | Ivanov | ...................... | G06F 8/61 |
| | | | | 717/174 |

(Continued)

*Primary Examiner* — Lewis A Bullock, Jr.
*Assistant Examiner* — Tina Huynh
(74) *Attorney, Agent, or Firm* — Kirton McConkie; Brian Tucker

(57) ABSTRACT

When it is desired to update a group of thin clients that have a common configuration, the update can be deployed to a reference device on which a replicate tool executes. The replicate tool can examine the file system and registry of the reference device and create a manifest that describes the current state. The manifest can then be published for access by an agent that executes on the thin clients in the group. When the agent receives the manifest, it can compare the received manifest to an existing manifest on the thin client that defines the thin client's current state to identify any artifacts that differ. The agent can then retrieve and install any artifacts the thin client needs to match the current state of the reference device.

20 Claims, 14 Drawing Sheets

(56) References Cited

U.S. PATENT DOCUMENTS

2014/0229439 A1* 8/2014 Bhullar .................. G06F 16/23
707/626
2018/0136920 A1* 5/2018 Devagupthapu ........ G06F 8/658

* cited by examiner

MECHANISM FOR CUSTOMIZING MULTIPLE COMPUTING DEVICES

CROSS-REFERENCE TO RELATED APPLICATIONS

N/A

BACKGROUND

The present invention is generally directed to a mechanism that facilitates customizing multiple computing devices. The present invention may be particularly beneficial when the computing devices are thin client with an operating system that employs a write filter to prevent modifications to the operating system image but may equally be employed when the thin clients or other computing devices do not include a write filter.

Thin client operating systems oftentimes provide functionality that can prevent the content of a storage medium from being changed permanently. In a typical example, it may be desirable to prevent the operating system image, which may be stored on a particular disk partition or on flash media, from being changed. To accomplish this, the thin client operating systems may provide a write filter that redirects I/O requests that would otherwise modify the contents of a protected volume to a temporary cache. These modifications can be maintained temporarily to provide the appearance that the contents is actually be updated on the protected volume. However, once the system reboots, the modifications will be discarded to return the system to its original state.

In the Windows Embedded operating system, there are two types of write filters that are available to provide this functionality: a file-based write filter which operates at the file level and a block-based write filter (or enhanced write filter) that operates at the block level. These write filters redirect all writes that target a protected volume to a RAM or disk cache called an overlay.

FIG. 1 illustrates how a file-based write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, file-based write filter 110 is positioned at the top of the driver stack and will therefore be able to process an IRP prior to the IRP being passed down to the lower level drivers. It is noted that, if the block-based write filter were instead employed, it would be positioned below file system driver 111 so that it may operate at the block level. File-based write filter 110 (as well as the block-based write filter) can be configured to detect writes targeting a protected volume and redirect them to overlay 140 rather than allowing them to be passed down the driver stack. As a result, the write will actually occur in overlay 140 rather than to disk 100. File-based write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

When an organization employs thin clients, it is typically desired to maintain a consistent operating system image on many thin clients. For example, the same image may be deployed to every thin client used by users in a particular group or by all users in the organization. In such cases, it can be very burdensome to perform an update, particularly when the thin clients employ a write filter. For example, to make an update permanent on a thin client with a write filter, it will be necessary to reboot to either disable the entire write filter or to add an exclusion that would permit the particular artifact on the protected volume to be updated. After the update is performed, it will then be necessary to reboot a second time to either enable the write filter or remove the exclusion. For this reason, users cannot use a thin client during the update process, at least not efficiently or securely. Also, in an organization with potentially thousands of thin clients that need to be updated, the process can be tedious and lengthy even if a management solution is employed.

BRIEF SUMMARY

The present invention extends to methods, systems, and computer program products for customizing multiple computing devices in an efficient manner. When it is desired to update a group of computing devices that have a common configuration, the update can be deployed to a reference device on which a replicate tool executes. The replicate tool can examine the file system and registry of the reference device and create a manifest that describes the current state. The manifest can then be published for access by an agent that executes on the computing devices in the group. When the agent receives the manifest, it can compare the received manifest to an existing manifest on the computing device that defines the computing device's current state to identify any artifacts that differ. The agent can then retrieve and install any artifacts the computing device needs to match the current state of the reference device.

When the computing device employs a write filter, the agent can install the artifacts while the write filter is enabled resulting in the artifacts being temporarily stored in the overlay. Then, the agent can call the write filter's commit function for each artifact that has been installed resulting in the artifact being persisted to the protected volume. If an artifact to be updated is in use, the agent can maintain the corresponding update in a temporary location and create a copy-on-reboot entry for the update. The update will then occur when the computing device is next rebooted rather than requiring an immediate reboot.

In one embodiment, the present invention is implemented as a method for updating a group of computing devices. An agent on each of the computing devices can receive a reference device manifest that defines a current state of a reference device. The agent can then compare the reference device manifest to a local manifest that defines a current state of the computing device to identify one or more artifacts that are included in the reference device manifest but not in the local manifest. The agent can retrieve the one or more identified artifacts and store them on the computing device to thereby update the computing device to match the current state of the reference device.

In another embodiment, the present invention is implemented as computer storage media storing computer executable instructions which when executed implement a replicate tool that is configured to create a reference device manifest defining a current state of a reference device and to publish the manifest along with artifacts that are identified in the manifest, and an agent that is configured to identify a local manifest defining a current state of a computing device on which the agent executes, compare the local manifest to the reference device manifest to identify any discrepancies between the local manifest and the reference device manifest, and update a configuration of the computing device based on the discrepancies.

In another embodiment, the present invention is implemented as a method for updating a plurality of computing devices. A replicate tool can browse a configuration of a reference device to generate a reference device manifest that identifies artifacts that are included on the reference device. The replicate tool can then publish the reference device manifest in conjunction with the identified artifacts. An agent on each of a number of computing devices can retrieve the reference device manifest and compare it to a local manifest that identifies artifacts that are included on the computing device. For any artifact that is identified in the reference device manifest but not in the local manifest, the agent can retrieve the identified artifact from the published artifacts and store the identified artifact on the computing device. For any artifact that is identified in both the reference device manifest and the local manifest but that has a different version in the reference device manifest than in the local manifest, the agent can retrieve the artifact from the published artifacts and store the retrieved artifact on the computing device in place of the corresponding artifact that was already stored on the computing device. For any artifact that is identified in the local manifest but not the reference device manifest, the agent can remove the artifact from the computing device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, the term "artifact" should be construed as encompassing files, directories, registry entries, or any other structure of a file system that can be updated. A "write filter" should be construed as any component, which will typically be in the form of a filter driver, that prevents artifacts on a protected volume from being modified. The "state" of a thin client should be construed as defining which artifacts exist on the thin client. For example, the state may define which applications, services, or other executable components are installed on the thin client and identify any configuration settings (e.g., registry settings in a Windows environment or the machine and application specific configuration files in a Linux environment) that may be stored in a file system to configure how the operating system or an application functions.

Figure 1:
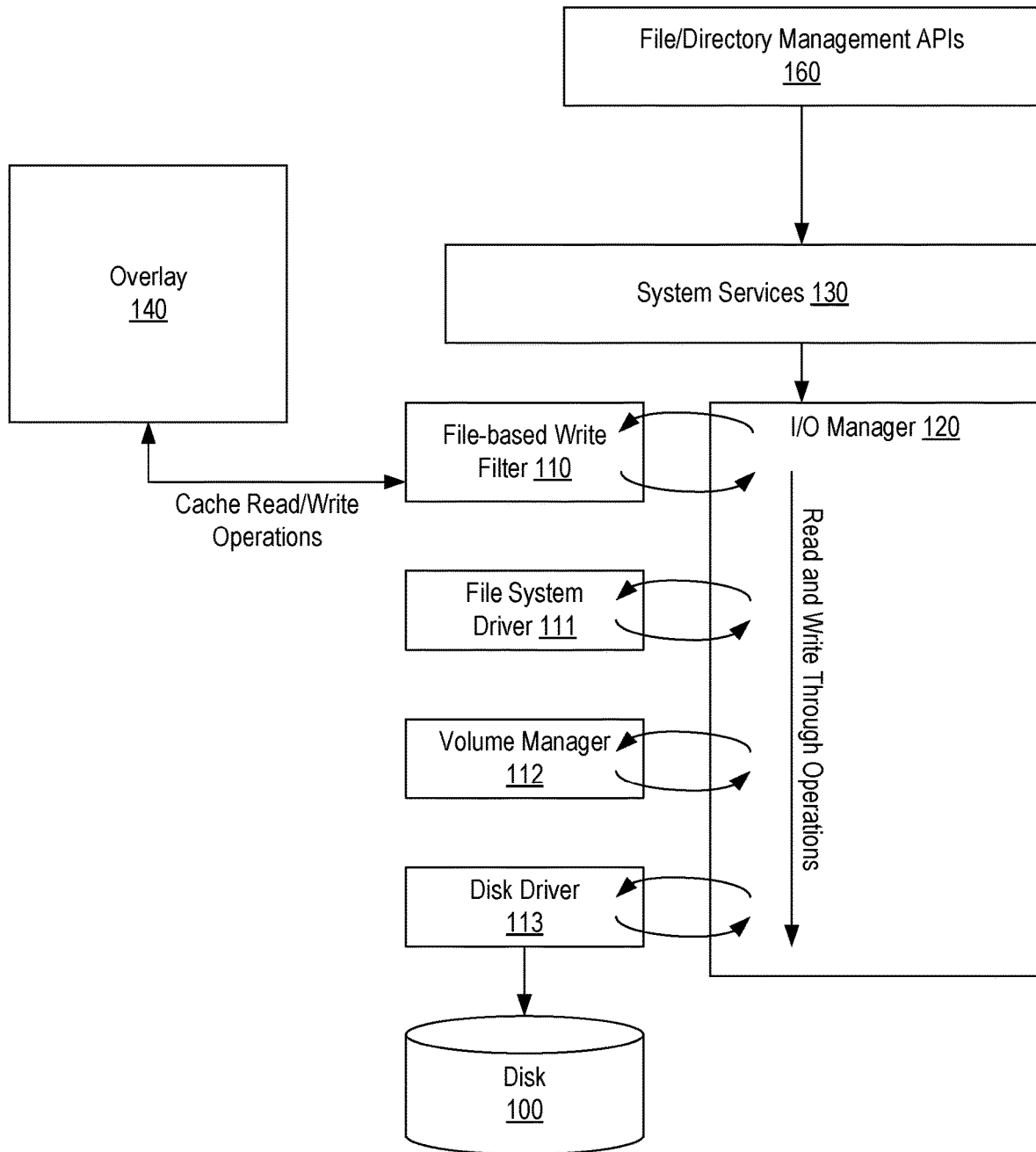
FIG. 1 illustrates a Windows-based I/O system in which a file-based write filter is employed to redirect writes targeting a protected volume to an overlay.
Figure 2:
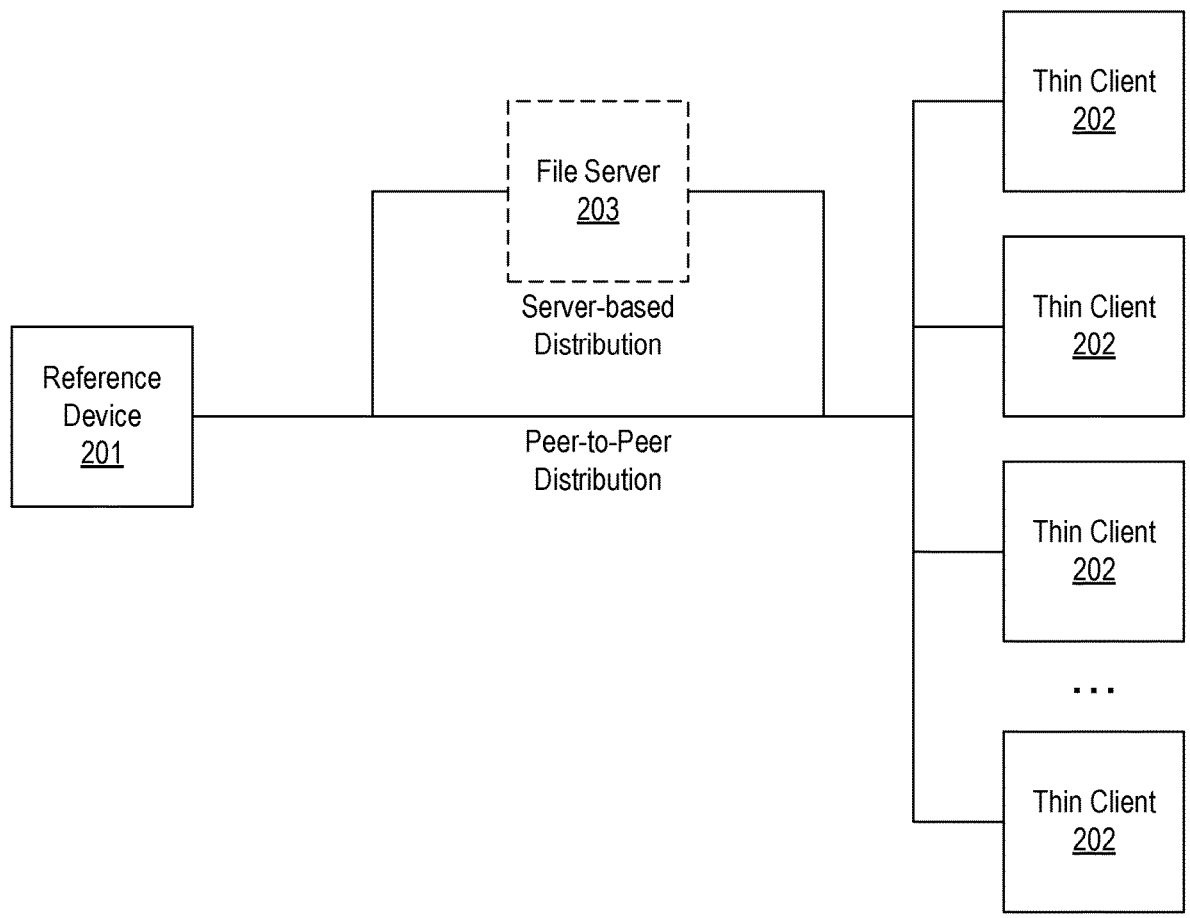
FIG. 2 illustrates an example computing environment in which the present invention can be implemented.

FIG. 2 illustrates an example computing environment 200 in which the present invention can be implemented. Environment 200 includes a reference device 201 (which may typically be a thin client) and a number of thin clients 202. Any number of thin clients 202 may correspond to reference device 201 as is represented by the ellipsis. In some embodiments, thin clients 202 may be configured to communicate with reference device 201 in a peer-to-peer fashion while in other embodiments, a file server 203 may be employed. File server 203 is therefore shown in dashes to represent that it is an optional component in environment 200.

A "thin client" should be construed as any computing device that employs any of the many different types of virtual desktop infrastructure (VDI) techniques to access a server (not shown). A thin client will therefore typically include an operating system, VDI components, and possibly other applications for local execution. Although the description will use an example where thin clients are updated, the present invention may equally be implemented with other computing device such as "fat clients." A "reference device" should be construed as a computing device that represents a desired state of a number of computing devices. Therefore, a reference device may typically be a thin client with a set of artifacts that should be replicated on other thin clients.

Figure 3:
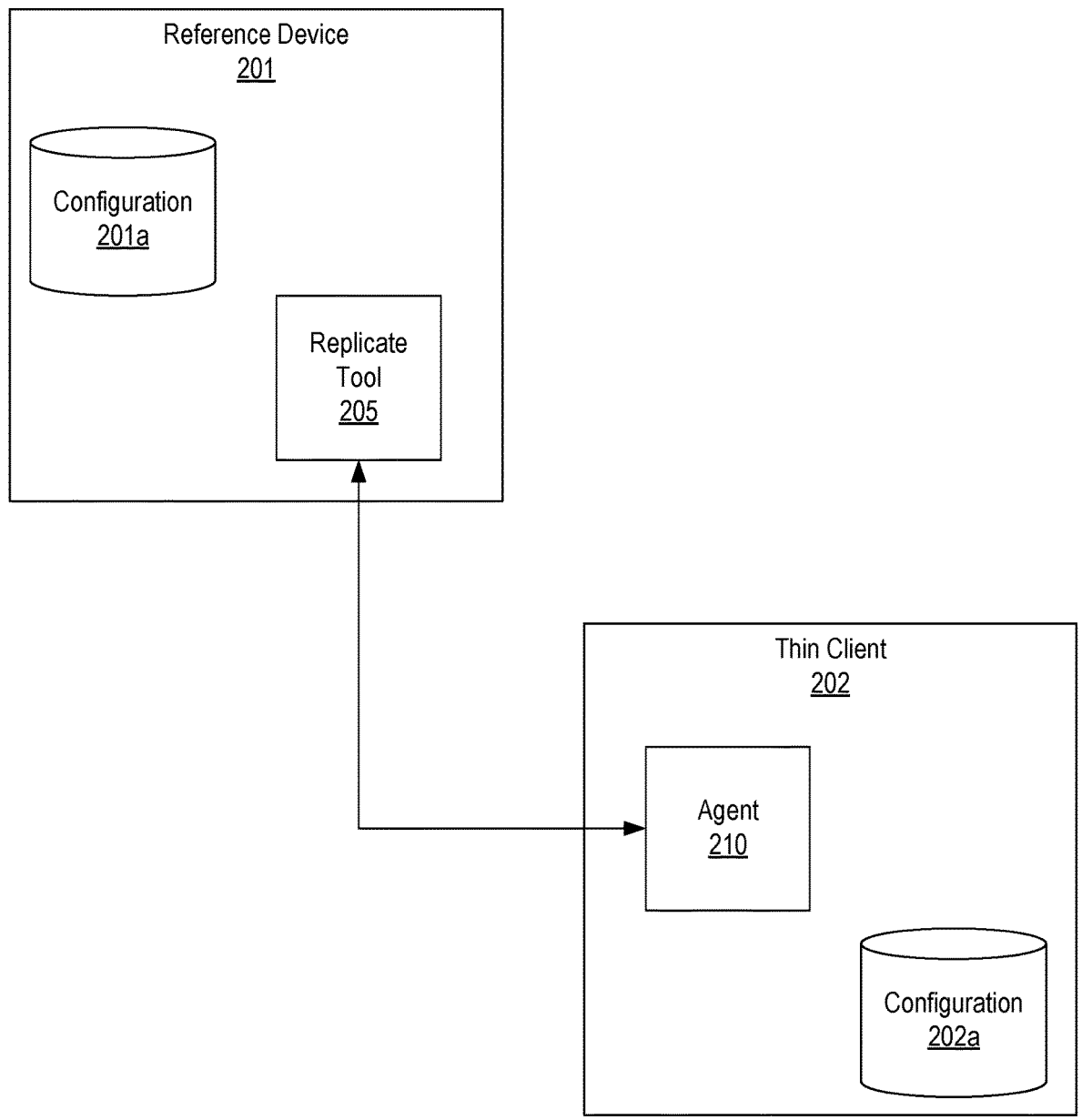
FIG. 3 illustrates components that can be employed on a reference device and a computing device to implement the present invention.

FIG. 3 illustrates various components of reference device 201 and thin client 202. As shown, reference device 201 includes configuration 201a while thin client 202 includes configuration 202a. Configurations 201a, 202a are intended to generally represent the collection of artifacts on the corresponding devices. Therefore, configuration 201a should be construed as encompassing any applications that are installed on reference device 201, any configuration files for the installed applications, and any configuration files for the operating system on reference device 201. Therefore, in a Windows context, configuration 201a should be construed as including both the file system and the registry. Likewise, configuration 202a should be construed as encompassing similar artifacts.

Reference device 201 is also shown as including a replicate tool 205 that is configured to create a manifest which defines the current state of reference device 201. In particular, replicate tool 205 can browse through configuration 201a to identify which artifacts exist on reference device 201. In contrast to what is shown in FIG. 2, in some embodiments, replicate tool 205 could be executed on a separate device (e.g., a management server) and could communicate with a local service (e.g., an agent) for the purpose of compiling a manifest. In such a case, the replicate tool should be viewed as included both the client-side and server-side components.

In typical embodiments, an administrator may update or otherwise alter the state of reference device 201 and then instruct replicate tool 205 to create a manifest that will reflect the current state of reference device 201 after the update. Alternatively, replicate tool 205 can be configured to automatically detect when the state of reference device 201 has been updated, and in response, create a manifest.

Once replicate tool 205 has created a manifest, it can make the manifest available to thin clients 202. In particular, agent 210 on thin clients 202 can be configured to retrieve (or otherwise receive) the manifest from reference device 201. As mentioned above, this can be accomplished in a peer-to-peer fashion or via file server 203. In the latter case, replicate tool 205 can be configured to deliver the manifest to file server 203. In some embodiments, agent 210 can be configured to check for a new manifest at regular intervals (e.g., every 30 minutes, every hour during business hours, every day at a particular time, at each reboot, etc.). If agent 210 detects that a new manifest is available, it can then take steps to determine whether the current state of thin client 202 matches the state defined in the manifest, and if not, update thin client 202 to match the state defined in the manifest. In this way, a number of thin clients can be efficiently updated to match the state of reference device 201.

FIGS. 4A-4F illustrate an example sequence of steps that can be performed to allow each of thin clients 202 to determine whether its current state matches the current state of reference device 201 and if not, to obtain any artifact necessary to match the current state of reference device 201. In these figures, it will be assumed that the states of reference device 201 and thin clients 202 had previously been consistent and that an administrator has performed an update on reference device 201 so that the current state of reference device 201 no longer matches the current state of each of thin clients 202. However, the same discrepancy in state could be reached when a new thin client is deployed or a thin client's state is somehow modified (whether intentionally or unintentionally). Therefore, the exact reason for which the current state of a thin client may not match the current state of the reference device is not essential to the invention.

Figure 4A:
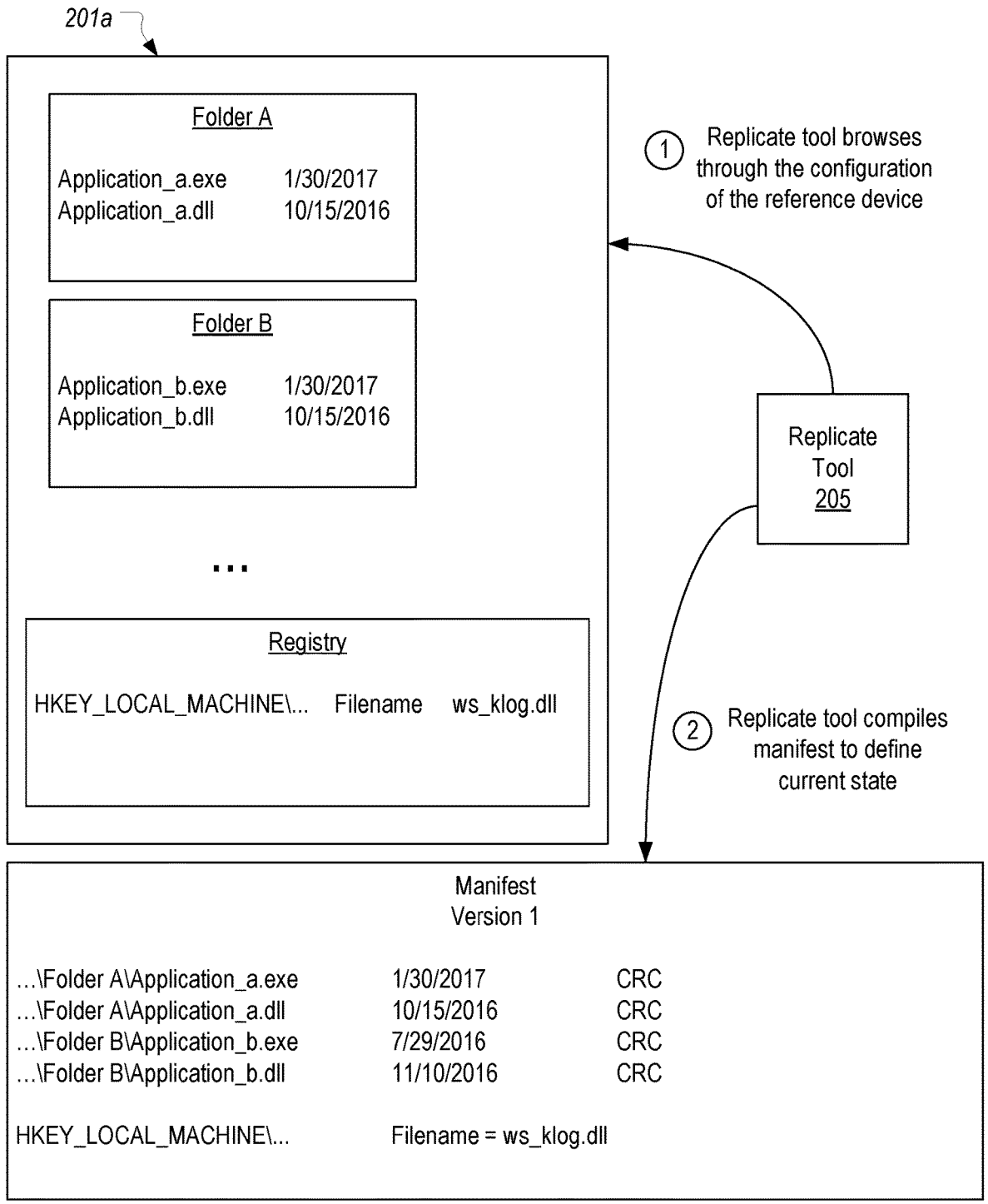
FIGS. 4A-4F illustrate a number of steps that can be performed to generate manifests on a reference device and on associated computing devices and to compare these manifests to identify how the computing devices should be updated to match a current state of the reference device.

In step 1 shown in FIG. 4A, replicate tool 205 browses through configuration 201a of reference device 201. As noted above, if replicate tool 205 executes on a separate device, step 1 may include communicating with an agent on reference device 201 to instruct the agent to browse through configuration 201a. In this example, it will be assumed that reference device 201 and thin clients 202 are running a version of the Windows operating system and therefore configurations 201a, 202a will include a file system and a registry. Accordingly, in FIG. 4A, configuration 201a is shown as including a number of artifacts including a Folder A which includes two files, a Folder B which also includes two files, and a registry that includes a registry key. Of course, this example is simplified for illustrative purposes and a typical device would include a large number of folders, files, and registry keys. In a non-Windows example, the registry would likely not be present but a similar file/folder architecture would exist.

In any case, based on the browsing of configuration 201a, replicate tool 205 can compile a manifest that defines the current state of reference device 201 in step 2. The manifest can identify each artifact that is included in configuration 201a and can provide some indication of a version or state of the artifact. For example, in FIG. 4A, the manifest identifies each file (including its path) along with a date of last modification and a CRC of the file. Either or both of the date of last modification and the CRC can later be used by agent 210 to determine whether thin clients 202 have a matching artifact as will be further described below. In the case of a registry entry, the manifest can include the full name of each subkey and its value. For example, the manifest in FIG. 4A includes an entry for the HKEY_LOCAL_MACHINE\SOFTWARE\VMware, Inc. \VMware VDM\Plugins\ wsnm\klog subkey having a value name of Filename and associated data of ws_klog.dll.

The manifest in FIG. 4A is also shown as including a version number which in this case is 1. Each manifest that is created can be assigned a version number (e.g., in a sequential manner) which can later be used by agent 210 to determine whether a new manifest is available. Also, although not shown in FIG. 4A, in conjunction with creating the manifest, replicate tool 205 can also cause a copy of configuration 201 (e.g., a backup image) to be made. This copy will therefore include each artifact that is identified in the manifest.

Figure 4B:
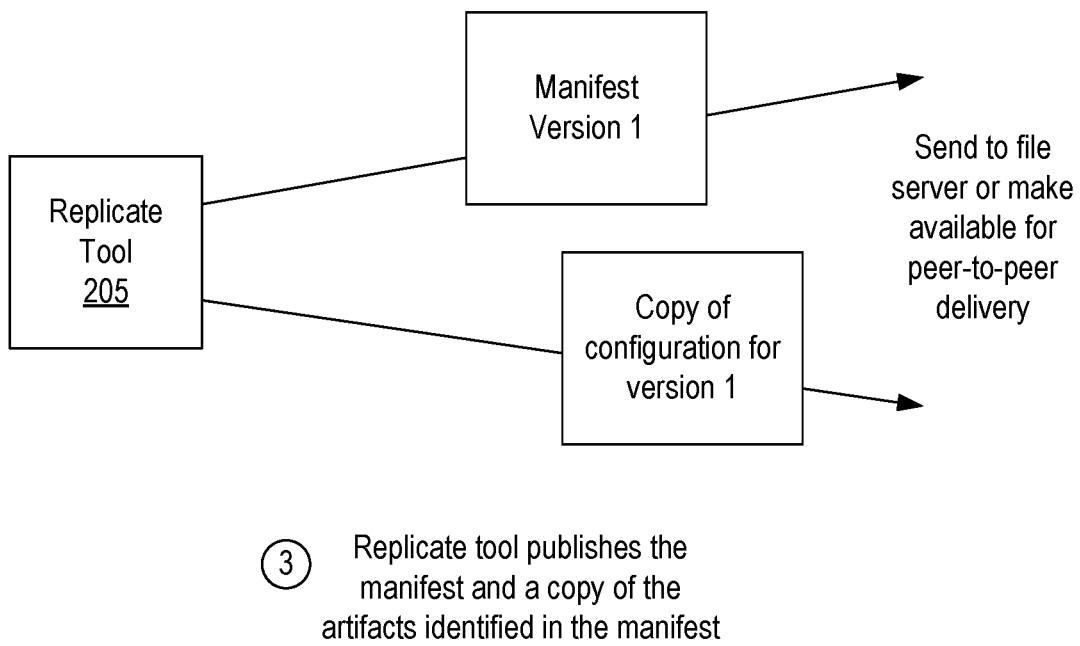

With the manifest and the copy of the configuration made, replicate tool 205 can then publish these items as represented in step 3 in FIG. 4B. In a peer-to-peer environment, the manifest and copy of the configuration can be made available directly on reference device 201. In contrast, in a client/server environment, replicate tool 205 can transfer the manifest and the copy of the configuration to file server 203.

Figure 4C:
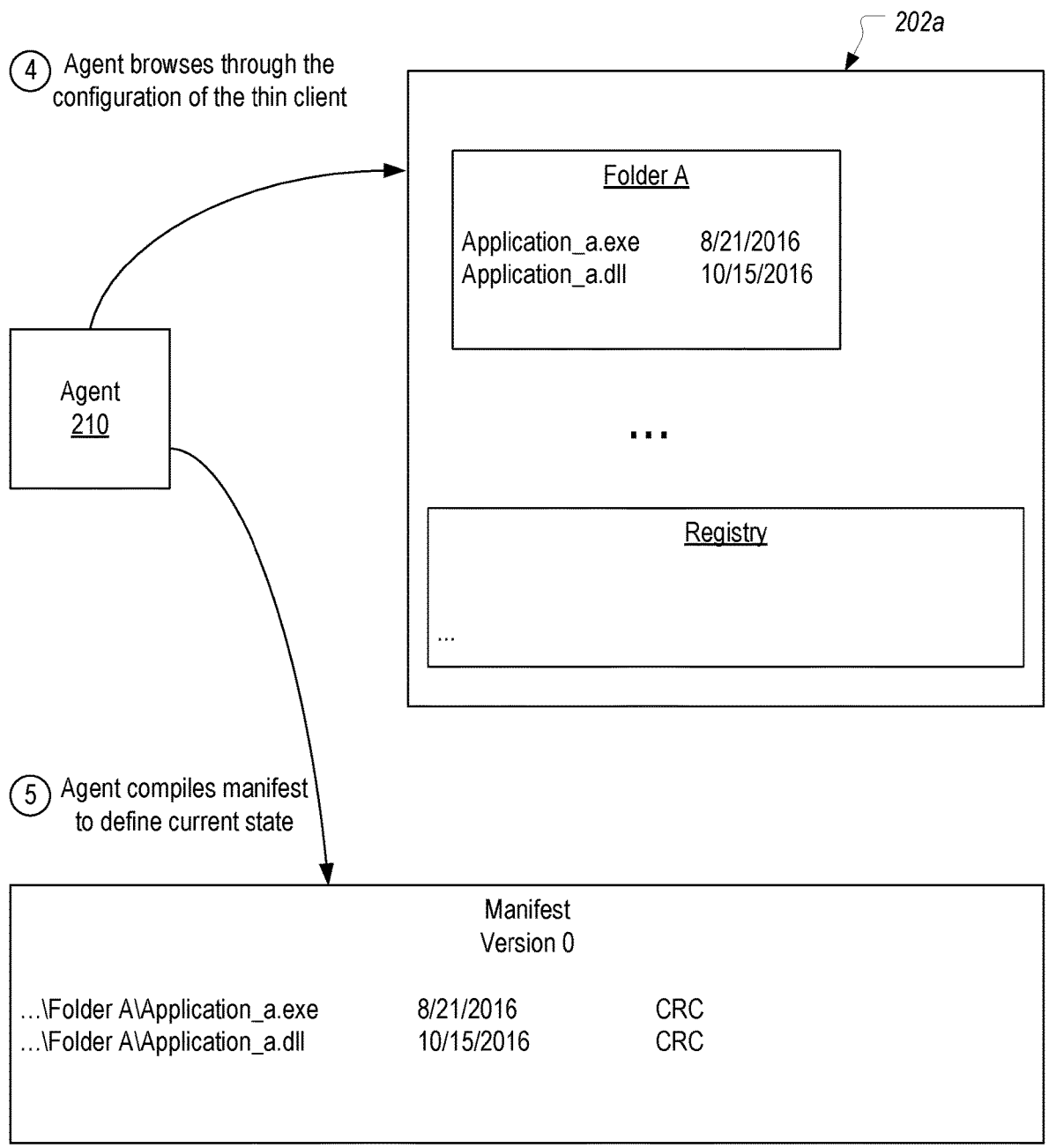

FIG. 4C illustrates steps that agent 210 can perform on each thin client 202 to create a manifest representing the current state of the thin client. Agent 210 can perform these steps at various times including prior to steps 1 and 2 (e.g., in response to the thin client being first deployed, as part of a previous process to compare the thin client's state to the state of reference device 201, after updating configuration 202a (whether as part of the manifest-based update process or otherwise), etc.) or after steps 1 and 2 (e.g., in response to determining that a new manifest is available).

In step 4, agent 210 can browse through configuration 202a, and then in step 5, agent 210 can compile a manifest to define the current state of thin client 202. Accordingly, steps 4 and 5 are substantially the same as steps 1 and 2. As described above, the manifest can identify each artifact that is included in configuration 202a as well as some indication of a version of the artifact. In this example, the manifest is shown as including a date of last modification and a CRC for each artifact. For ease of illustration, it will be assumed that configuration 202a includes Folder A with two files and no registry entries.

Figure 4D:
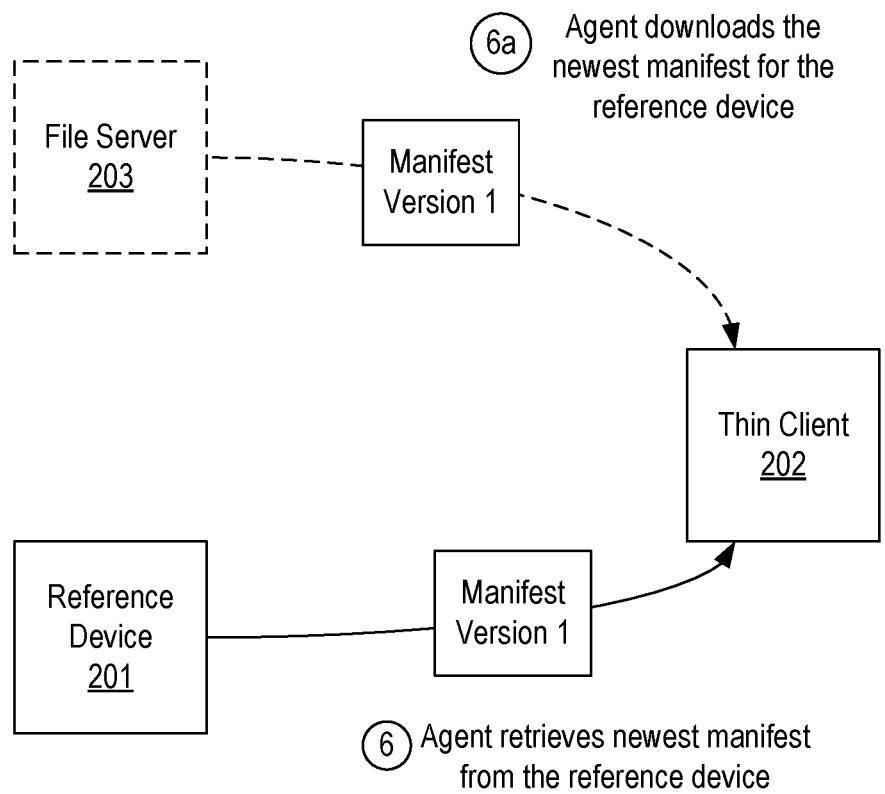

Agent 210 can also assign a version to the manifest. As will be described in more detail below, the version can represent the last version of the manifest that was received from reference device 201. In other words, the version of the manifest for thin client 202 can represent the state of the thin client after the last update process. FIG. 4D, however, is intended to represent a case where thin client 202 has yet to be updated and therefore has not yet created a manifest to define its state. In such a case, agent 210 can assign a version of 0 to the manifest to thereby indicate that it is the first manifest created on the thin client. In this way, any version of a manifest created on reference device 201 (which would occur when reference device 201 is updated) will be higher than the version of the manifest on a newly deployed thin client 202.

In contrast, if a manifest had already been created on thin client 202 (which would be the case if the thin client had previously been through the update process), agent 210 can instead identify the version of the existing manifest rather than creating a version 0. Whether agent 210 generates a new manifest with a version of 0 or identifies the version of an existing (i.e., most recent) manifest, agent can then use the version of the manifest to determine whether the manifest for reference device 201 has a higher version. In this example, because the manifest that was published in step 3 has a version of 1 while the manifest generated by agent 210 has a version of 0, agent 210 can determine that a new version of the manifest is available. In response, in step 6, agent 210 can retrieve the manifest from reference device 201, or in a client/server environment as represented in step 6a, can download the manifest from file server 203.

Figure 4E:
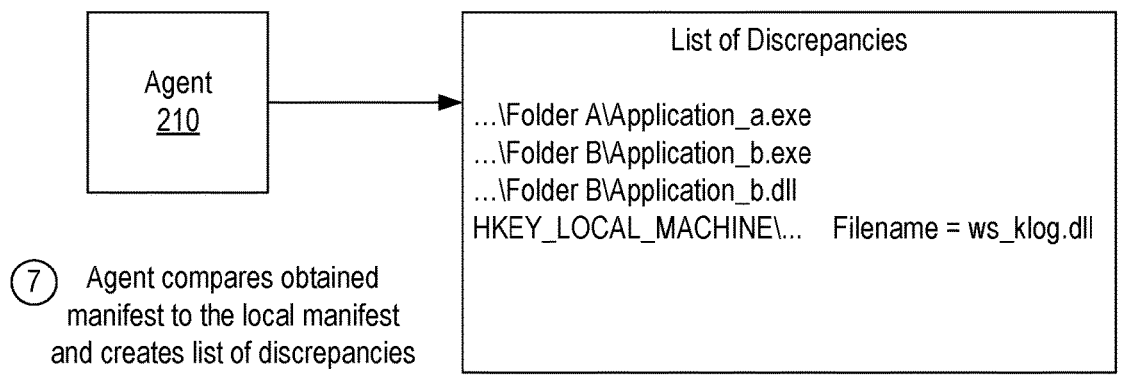
Figure 4F:
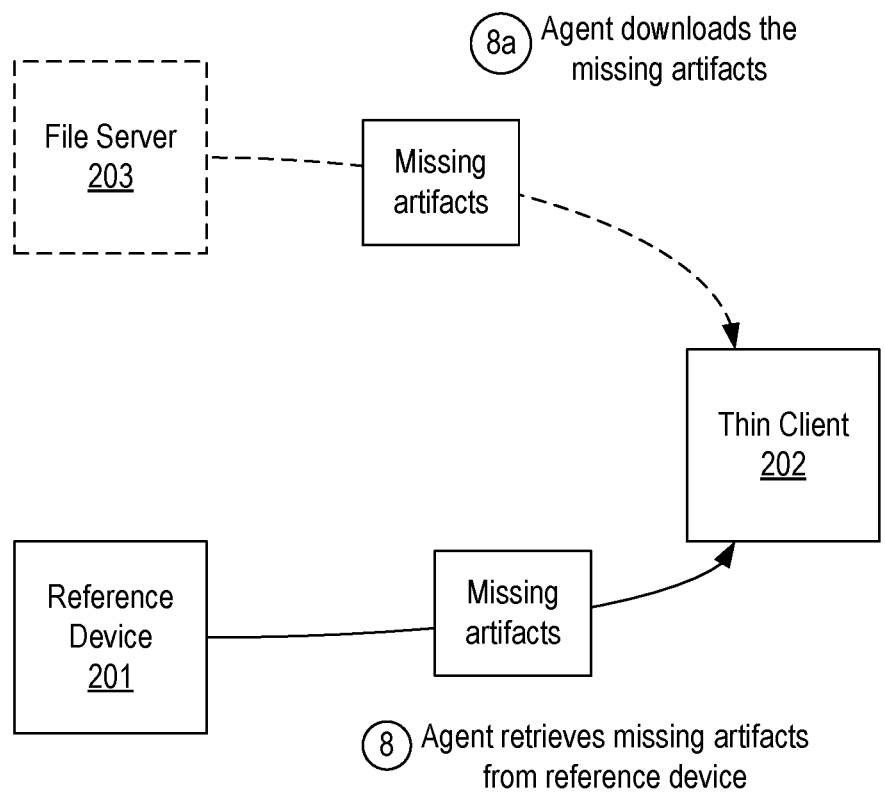

Next, in step 7 shown in FIG. 4E, agent 210 can compare the received manifest that defines the current state of reference device 201 to the local manifest that defines the current state of thin client 202. Based on this comparison, agent 210 can identify any discrepancies between the two versions of the manifest. For example, in FIG. 4E, version 1 of the manifest indicates that reference device 201 includes Application_b.exe and Application_b.dll in . . . \Folder B and a registry subkey HKEY_LOCAL_MACHINE\SOFTWARE\VMware, Inc. \VMware VDM\Plugins\wsnm\klog subkey having a value name of Filename and associated data of ws_klog.dll. Because the local manifest does not include these artifacts, agent 210 can determine that they are new artifacts that have been added to reference device 201 (e.g., as a result of installing a new application).

Also, based on the date of last modification, agent 210 can determine that the version of Application_a.exe on thin client 202 may not be the same as the version of Application_a.exe on reference device 201. In particular, Application_a.exe was last Modified on reference device 201 on Jan. 30, 2017 while Application_a.exe was last modified on thin client 202 on Aug. 21, 2016. A discrepancy in the date of last modification will not necessarily indicate a mismatch in artifacts (e.g., when the artifact is updated on thin client 202 on a different day than it was updated on reference device 201). Therefore, the CRC (or another type of hash of the contents of the artifact) can be employed to compare the contents of each artifact. Specifically, if both manifests identify the same artifact and include a matching CRC, it can be known that the version of the artifact on thin client 202 matches the version of the artifact on reference device 201. On the other hand, if both manifests identify the same artifact and include mismatching CRCs, it can be assumed that the version of the artifact on thin client 202 needs to be updated to match the version of the artifact on reference device 201.

In some embodiments, agent 210 can employ the date of last modification as a first test for identifying mismatching artifacts and can then check the CRCs only for artifacts that do not have the same date of last modification. Also, in some embodiments, agent 210 may only generate a CRC of an artifact on thin client 202 after it has been determined that the date of last modification for the artifact does not match the date of last modification of the artifact defined in the received manifest. In this way, agent 210 can reduce the amount of processing that is performed on thin client 202. In contrast, in other embodiments, the manifests may only include a date of last modification or a CRC for each artifact, and agent 210 may employ this single criterion to determine whether a version of an artifact should be updated.

As is evident from the figures, in the case of registry entries, the value name and associated data may be directly defined within the manifest so that there would be no need to include a date of last modification or a CRC. In other words, agent 210 could identify whether each registry subkey defined in the received manifest is present in the local manifest and has the same value name and associated data. Alternatively, rather than identifying individual registry keys in the manifest, the entire registry file could be identified, and in such a case, a date of last modification and/or a CRC can be included.

With each discrepancy identified, agent 210 can then commence the process of updating thin client 202. In typical scenarios, agent 210 will identify that artifacts have been added to or upgraded on reference device 201 and can take appropriate steps to obtain and deploy the new/updated artifacts on thin client 202 as represented in steps 8 and 8a in FIG. 4F. For example, using the list of discrepancies, agent 210 can request each artifact that should be added to or updated on thin client 202 from reference device 201 or file server 203. Because the copy of all the artifacts was published in step 3, these artifacts will be available to any of thin clients 202 that need them. If a new artifact is obtained, it can be stored at the appropriate location on thin client 202, whereas if an updated artifact is obtained it can be stored in place of the existing artifact.

In the case of a registry entry, agent 210 can employ the information included in the received manifest to update/create the corresponding entry on thin client 202. In other words, for registry entries, agent 210 may not need to perform step 8 or 8a. Also, in some cases, it is possible that an update to reference device 201 entailed deleting an artifact. In such cases, agent 210 will have identified that the local manifest includes an artifact that is not included in the received manifest, and in response, can take the necessary steps to delete the artifact from thin client 202. Such may be the case when an application is uninstalled from reference device 201 or an operating system update is reversed.

In short, based on the comparison of the received manifest to the local manifest, agent 210 can take appropriate action to cause thin client 202's state to match the current state of reference device 201 on an artifact-by-artifact basis. In comparison to deploying an entire updated image to thin clients, the present invention will require far less network bandwidth and processing. Also, because the reference device can represent a large number of thin clients, the administrator can be relieved of the burdensome task of individually managing the update of each thin client.

Once the state of thin client 202 has been updated appropriately, agent 210 may store the received manifest which will now represent the current state of thin client 202. Alternatively, agent 210 could generate a new manifest based on the state of thin client 202 after the update and assign it a version number that matches the version number of the received manifest on which the update was based. In either case, in the current example, a manifest with a version of 1 would be stored on thin client 202 to represent that it has been updated to be consistent with the state of reference device 201 as defined in version 1 of the manifest. Agent 210 can maintain this manifest for use in subsequent iterations of the update process. For example, in a next iteration, replicate tool 205 may generate a manifest with a version of 2. Then, at the next polling cycle, agent 210 would determine that its local manifest has a lower version than the published manifest and can again initiate the update process. This cycle would be repeated any time an update is made to reference device 201 (or at least any time that replicate tool 205 is instructed to create a new manifest after an update has been made).

In many embodiments, thin client 202 will include a write filter, such as file-based write filter 110, which will prevent an artifact from being permanently created or updated. In such cases, if agent 210 attempts to store an artifact on thin client 202, the artifact will only be stored temporarily and will be lost when thin client 202 is rebooted. FIGS. 5A-5D illustrate how agent 210 can be configured to address these situations.

Figure 5A:
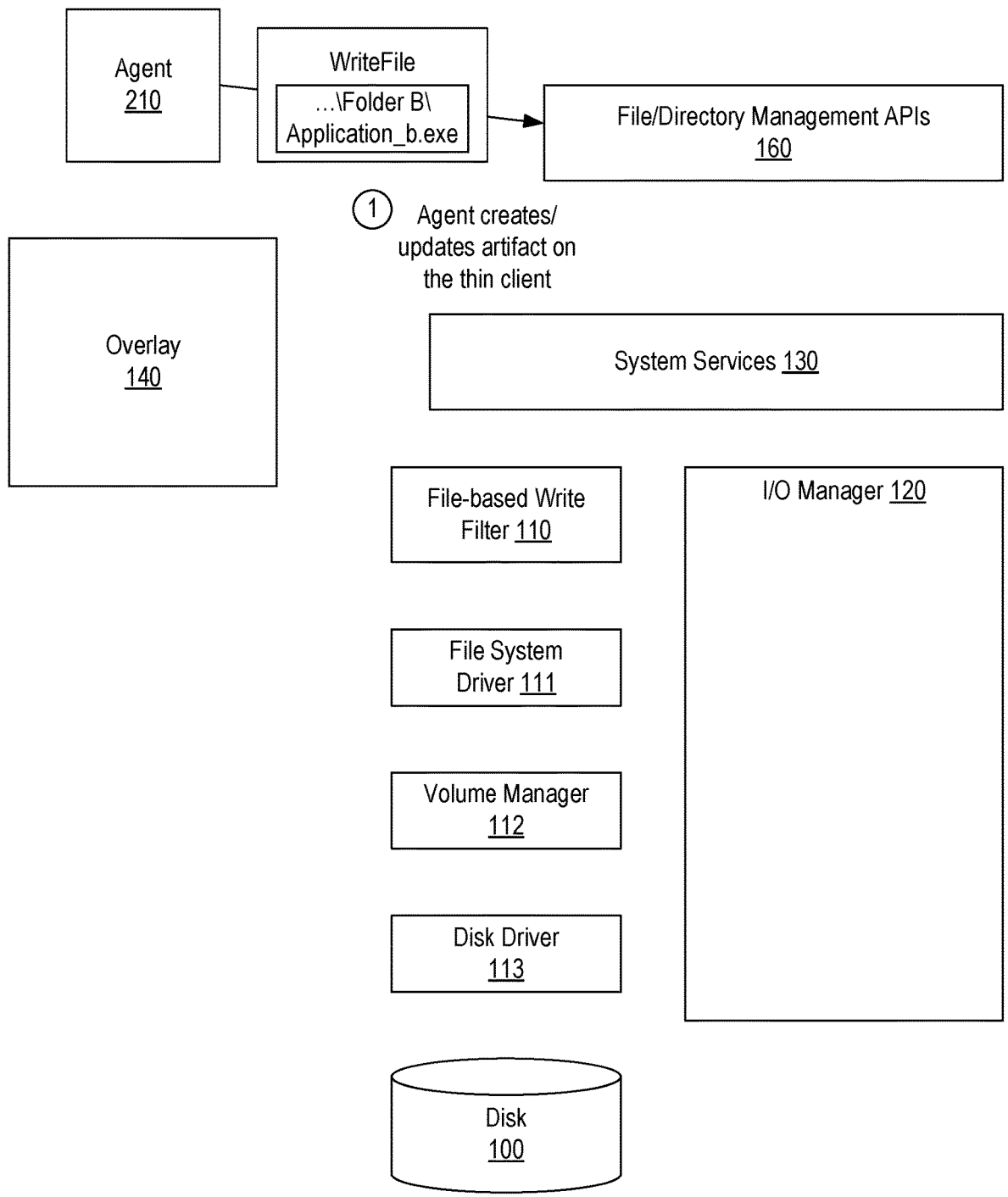
FIGS. 5A-5D illustrates how the present invention can be implemented when a write filter is employed on the computing devices.

In FIG. 5A, it is assumed that agent 210, based on the process depicted in FIGS. 4A-4F, has retrieved the contents of Application_b.exe from reference device 201 (or file server 203) and is now attempting to create Application_b.exe in Folder B on thin client 202 as represented in step 1. For example, agent 210 could call CreateFile to obtain a handle to a file named . . . Folder B\Application_b.exe and then call WriteFile to write the contents of Application_b.exe to the file.

Figure 5B:
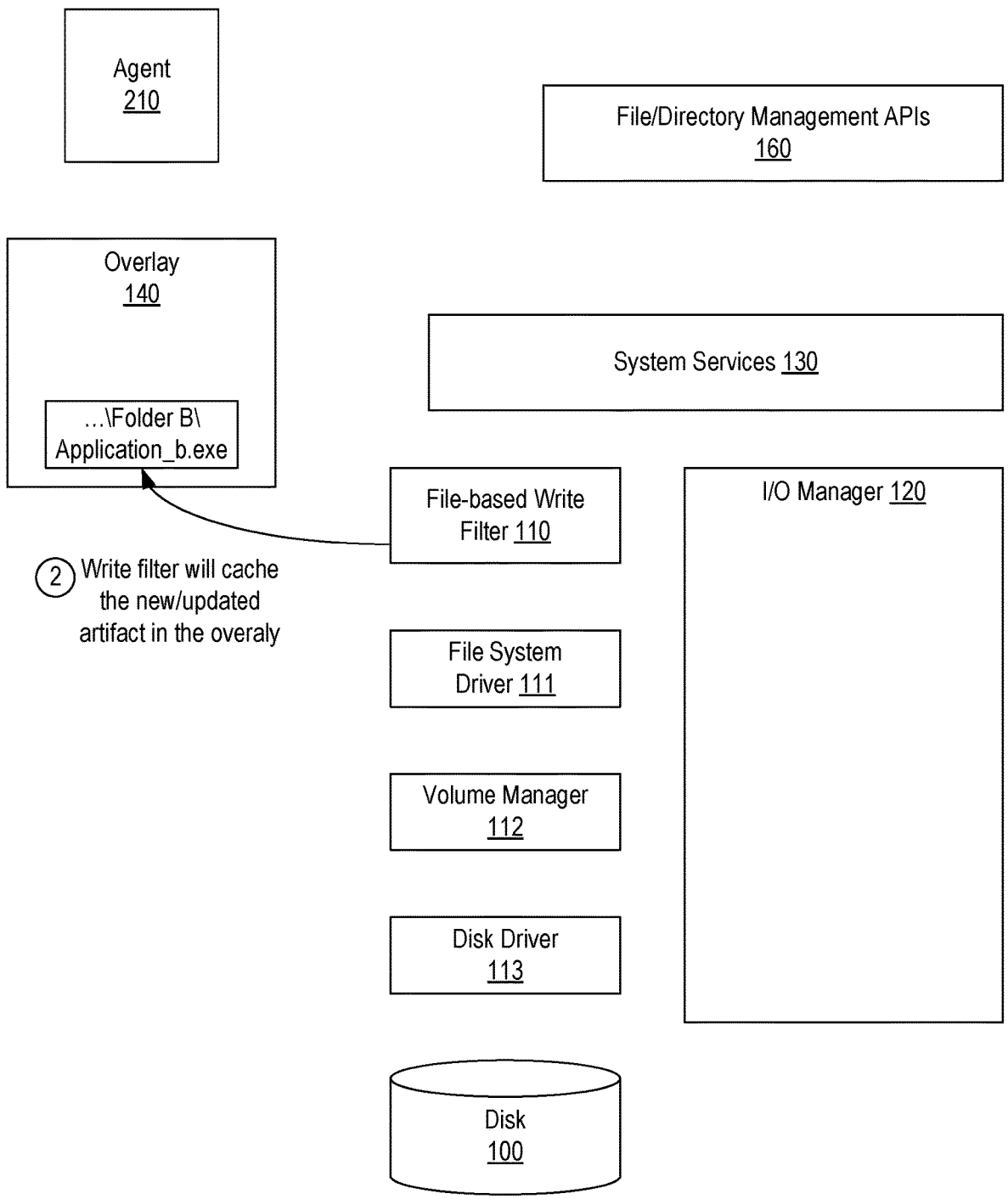

Assuming Folder B is not registered as an exclusion with file-based write filter 110, file-based write filter 110 will intercept the IRP that is created to represent this write and redirect it to overlay 140 in step 2 shown in FIG. 5B. As a result, Application_b.exe will be stored temporarily in overlay 140 rather than at the . . . \Folder B location on disk 100. At this point, Application_b.exe would be available on thin client 202 only during the current session.

To make Application_b.exe permanently available on thin client 202, agent 210 can request that file-based write filter 110 commit the artifact to disk 100. For example, this can be accomplished by calling the FbwfCommitFile function as shown in step 3 in FIG. 5C. In response, in step 4 shown in FIG. 5D, file-based write filter 110 will copy Application_b.exe to the . . . \Folder B\ location on disk 100.

Agent 210 can therefore be configured to detect when a write filter is enabled on thin client 202 and, if so, request that any artifact that is added or updated on thin client 202 be committed. For example, if a write filter is enabled, agent 210 can be configured to call FbwfCommitFile once the call to WriteFile completes successfully. This will ensure that any artifact that is added or updated on thin client 202 will be persisted.

Figure 5C:
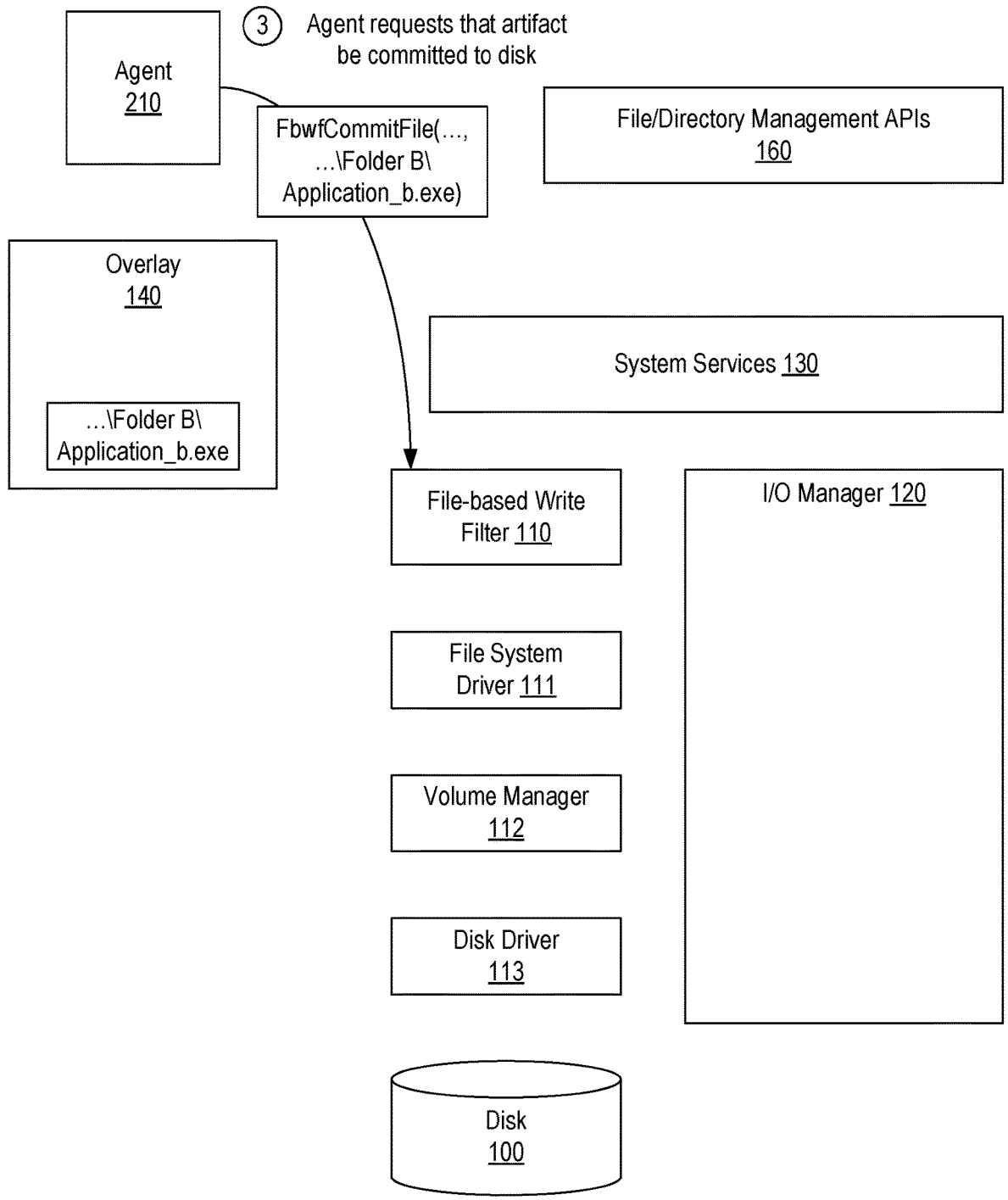
Figure 5D:
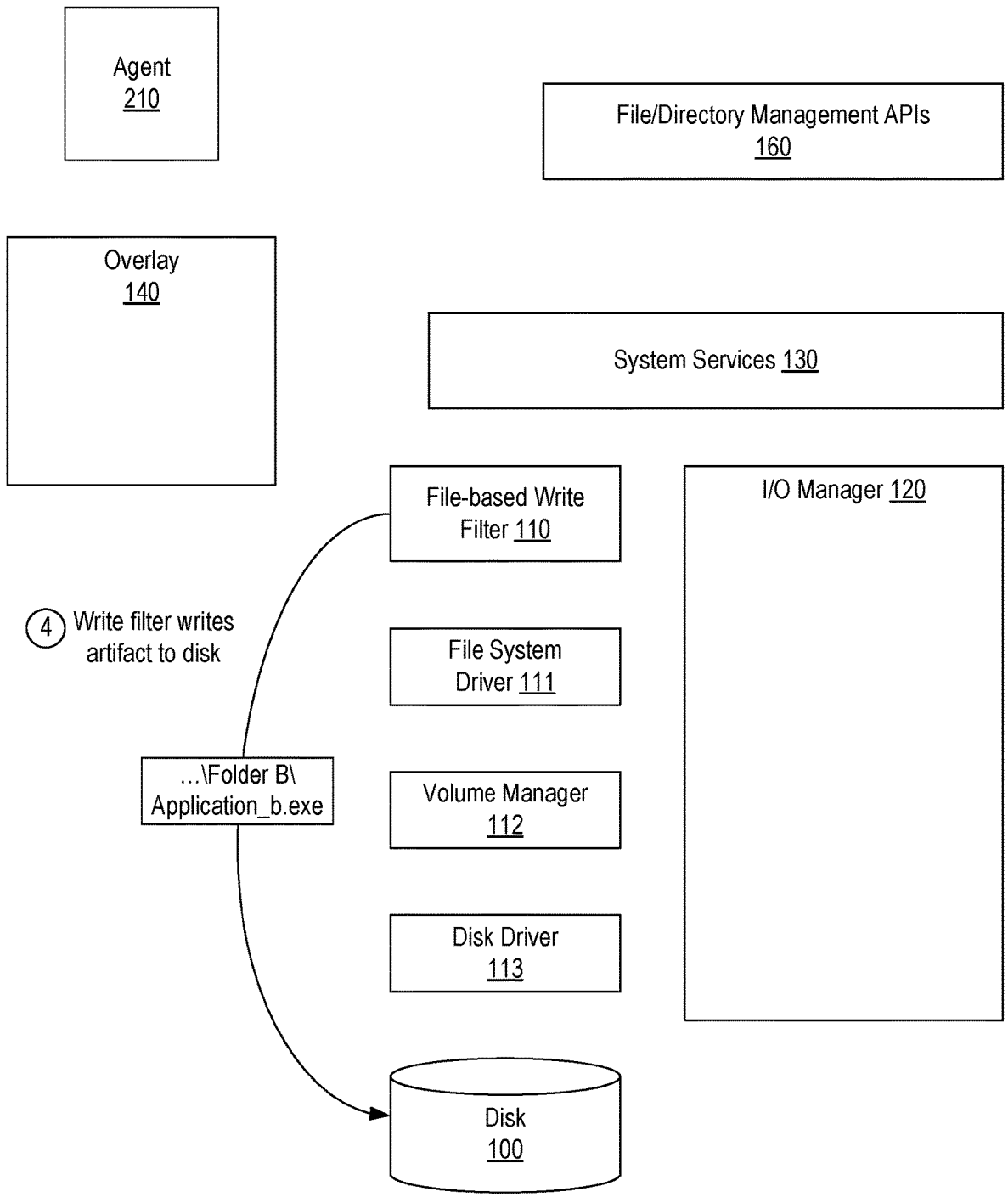
Figure 6:
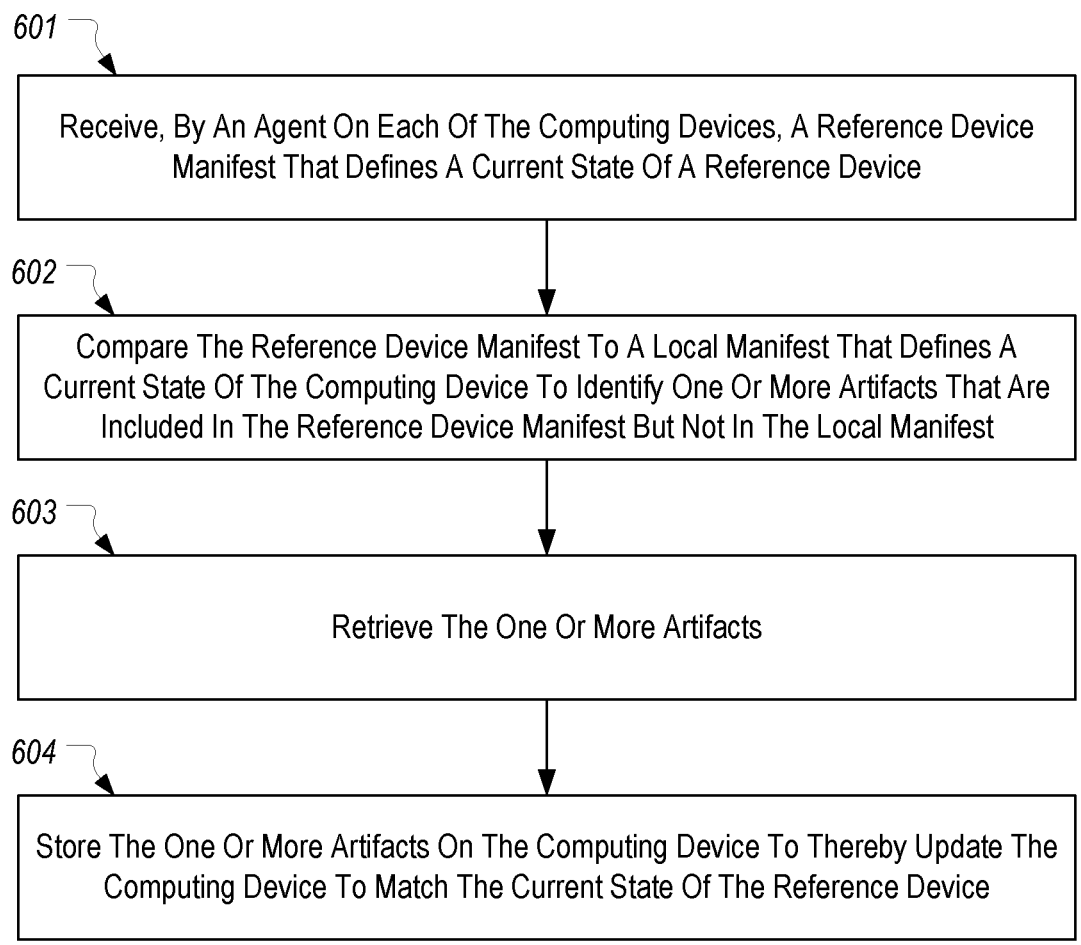
FIG. 6 provides a flowchart of an example method for updating a group of computing devices.

In some cases, agent 210 may not be able to obtain write access to an existing artifact on thin client 202. For example, if Application_a.exe is in use on thin client 202 when agent 210 retrieves the newer version, agent 210 will not be able to replace the existing version with the new version. The same may be true of any other artifact that may be locked. In such cases, agent 210 can be configured to store the artifact at a temporary location on disk (by using the process shown in FIGS. 5A-5D) and then create a registry entry that indicates that the artifact should be copied on reboot to replace the existing artifact. For example, this can be accomplished by calling the MoveFileEx function and specifying as input parameters the temporary location of the artifact, the intended location of the artifact, and the MOVEFILE_DELAY_UNTIL_REBOOT flag. In the case of an artifact that needs to be deleted, the MoveFileEx function may also be employed (e.g., by using NULL for the intended location of the artifact). Because this technique involves creating registry entries (which will be viewed as modifications to a registry file), it may be necessary to commit the registry file after the registry entries are created in overlay 140 in a similar manner as depicted in FIG. 5C. Alternatively, if a separate registry filter is employed, the specific registry entries may be committed (as opposed to committing the entire registry hive). When this approach is used, the operating system will automatically copy the artifacts to the desired location during the next reboot based on the values defined in the registry keys.

Using the techniques of the present invention, a thin client that includes a write filter can be updated with one reboot (if it is necessary to update locked artifacts) or no reboots. The update process can therefore be performed much more easily and even while a user is logged on but without the security concerns that would otherwise exist if the write filter was disabled.

Although the present invention has been described in the context of thin clients, it may equally be implemented for any type of computing devices. For example if thin clients 202 were instead PCs, reference device 201 could also be a PC and the above-described process could be performed in the same manner.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for updating a group of computing devices comprising:
scanning a file system and a registry database of a reference device to identify each file of a plurality of files in the file system and each registry key of a plurality of registry keys in the registry database;
based on the scanning, generating a reference device manifest that includes an entry for each identified file of the files in the file system and an entry for each identified registry key of the registry keys in the registry database, each entry identifying the file or registry key to which the entry pertains;
publishing the reference device manifest along with a copy of each identified file of the files and each identified registry key of the registry keys;
receiving, by an agent on each of the computing devices, the reference device manifest;
comparing, by the agent on each of the computing devices, the reference device manifest to a local manifest that includes entries for each file in a file system of the computing device and each registry key in a registry database of the computing device;
based on the comparison, determining, by the agent one each of the computing devices, that the reference device manifest includes a plurality of entries that are not included in the local manifest, the plurality of entries pertaining to one or more files and one or more registry keys;
employing, by the agent on each of the computing devices, each of the plurality of entries in the reference device manifest that are not included in the local manifest to retrieve the copy of the file or registry to which the entry pertains such that a copy of each of the one or more files and a copy of each of the one or more registry keys are retrieved; and
copying, by the agent on each of the computing devices, the one or more retrieved files to the file system of the computing device and the one or more retrieved registry keys to the registry database of the computing device to thereby cause the files in the file system of each of the computing devices to match the files in the file system of the reference device and the registry keys in the registry database of each of the computing devices to match the registry keys in the registry database of the reference device.

2. The method of claim 1, further comprising:
prior to receiving the reference device manifest, determining that a version of the local manifest does not match a version of the reference device manifest.

3. The method of claim 2, wherein the version of the local manifest is lower than the version of the reference device manifest.

4. The method of claim 1, further comprising:
based on the comparison, determining, by the agent on each of the computing devices, that the reference device manifest includes an entry that identifies a first file and a first version and that the local manifest includes an entry that identifies the first file and a second version;
retrieving the first version of the first file; and
copying the first version of the first file to the file system of the computing device in place of the second version of the first file that is present in the file system of the computing device.

5. The method of claim 4, wherein the first and second versions are defined in the respective entries by a date of last modification such that the determination comprises determining that the dates of last modification do not match.

6. The method of claim 4, wherein the first and second versions are defined in the respective entries by a cyclic redundancy check (CRC) of the corresponding file such that the determination comprises determining that the respective CRCs do not match.

7. The method of claim 4, wherein copying the first version of the first file to the file system of the computing device comprises causing the first version of the first file to be copied on reboot to a desired location in the file system of the computing device.

8. The method of claim 7, wherein causing the first version of the first file to be copied on reboot to the desired location in the file system of the computing device comprises causing a write filter to commit one or more registry entries to a protected volume.

9. The method of claim 4, wherein copying the first version of the first file to the computing device comprises causing a write filter to commit the first version of the first file to a protected volume on which the file system is maintained.

10. The method of claim 1, wherein copying the one or more retrieved files to the file system of the computing device and the one or more retrieved registry keys to the registry database of the computing device comprises causing a write filter to commit the one or more retrieved files and the one or more retrieved registry keys to a protected volume.

11. The method of claim 1, further comprising:
based on the comparison, determining that the local manifest includes entries that are not included in the reference device manifest; and
deleting, from the computing device, the files or registry keys that pertain to the entries that are included in the local manifest but are not included in the reference device manifest.

12. The method of claim 1, wherein the one or more files and the one or more registry keys retrieved and copied by one of the computing devices is different from the one or more files and the one or more registry keys retrieved and copied by another one of the computing devices.

13. The method of claim 1, wherein the one or more retrieved files comprise one or more .exe or .dll files.

14. One or more non-transitory computer storage media storing computer executable instructions which when executed implement a method for updating a group of computing devices comprising:
scanning a file system and a registry database of a reference device to identify each file of a plurality of files in the file system and each registry key of a plurality of registry keys in the registry database;
based on the scanning, generating a reference device manifest that includes an entry for each identified file of the files in the file system and an entry for each identified registry key of the registry keys in the registry database, each entry identifying the file or registry key to which the entry pertains;
publishing the reference device manifest along with a copy of each identified file of the files and each identified registry key of the registry keys;

receiving, by an agent on each of the computing devices, the reference device manifest;

comparing, by the agent on each of the computing devices, the reference device manifest to a local manifest that includes entries for each file in a file system of the computing device and each registry key in a registry database of the computing device;

based on the comparison, determining, by the agent one each of the computing devices, that the reference device manifest includes a plurality of entries that are not included in the local manifest, the plurality of entries pertaining to one or more files and one or more registry keys;

employing, by the agent on each of the computing devices, each of the plurality of entries in the reference device manifest that are not included in the local manifest to retrieve the copy of the file or registry to which the entry pertains such that a copy of each of the one or more files and a copy of each of the one or more registry keys are retrieved; and copying, by the agent on each of the computing devices, the one or more retrieved files to the file system of the computing device and the one or more retrieved registry keys to the registry database of the computing device to thereby cause the files in the file system of each of the computing devices to match the files in the file system of the reference device and the registry keys in the registry database of each of the computing devices to match the registry keys in the registry database of the reference device.

15. The computer storage media of claim 14, wherein copying the one or more retrieved files to the file system of the computing device and the one or more retrieved registry keys to the registry database of the computing device comprises causing a write filter to commit the one or more retrieved files and the one or more retrieved registry keys to a protected volume.

16. The computer storage media of claim 14, wherein the method further comprises:

storing, on each of the computing devices, the reference device manifest;

receiving a subsequent reference device manifest that includes an entry for each of the files in the file system of the reference device at a subsequent time and an entry for each of the registry keys in the registry database of the reference device at the subsequent time;

comparing the subsequent reference device manifest to the stored reference device manifest;

based on the comparison, determining that the subsequent reference device manifest includes one or more entries that are not included in the stored reference device manifest;

employing each of the one or more entries in the subsequent reference device manifest to retrieve a copy of the file or registry key to which the entry pertains; and copying the one or more retrieved files or registry keys to the file system or the registry database of the computing device to thereby cause the files in the file system of each of the computing devices to match the files in the file system of the reference device at the subsequent time and the registry keys in the registry database of each of the computing devices to match the registry keys in the registry database of the reference device at the subsequent time.

17. The computer storage media of claim 14, wherein the method further comprises:

based on the comparison, determining, by the agent on each of the computing devices, that the reference device manifest includes an entry that identifies a first file or registry key and a first version and that the local manifest includes an entry that identifies the first file or registry key and a second version;

retrieving the first version of the first file or registry key; and copying the first version of the first file or registry key to the file system or registry database of the computing device in place of the second version of the first file or registry key.

18. The computer storage media of claim 14, wherein the method further comprises:

based on the comparison, determining that the local manifest includes one or more entries that are not included in the reference device manifest; and deleting, from the computing device, the one or more files or registry keys that pertain to the one or more entries that are included in the local manifest but are not included in the reference device manifest from the file system or the registry database of the computing device.

19. The computer storage media of claim 14, wherein the local manifest comprises a previously received reference device manifest that includes entries for files and registry keys that existed in the file system and registry database of the reference device at a previous time.

20. A system for updating a plurality of computing devices comprising:

a reference device having one or more processors and non-transitory computer storage media storing computer-executable instructions which when executed by the one or more processors implement a replicate tool that browses a file system and a registry database of the reference device to generate a reference device manifest that includes entries which identify each file in the file system and each registry key in the registry database, and then publishes the reference device manifest in conjunction with a copy of each file in the file system and each registry key in the registry database; and the plurality of computing devices, each computing device having one or more processors and non-transitory computer storage media storing computer-executable instructions which when executed by the one or more processors of the computing device implement an agent that updates the computing device by:

retrieving the reference device manifest;

comparing the reference device manifest to a local manifest that includes entries which identify each file in a file system of the computing device and each registry key in a registry database of the computing device;

for any file or registry key that is identified in an entry in the reference device manifest but is not identified in an entry in the local manifest, retrieving the published copy of the file or registry key identified in the entry in the reference device manifest and copying the retrieved file or registry key to the file system or registry database of the computing device;

for any file or registry key that is identified in entries in both the reference device manifest and the local manifest but that has a different version in the reference device manifest than in the local manifest, retrieving the published copy of the file or registry key identified by the entry in the reference device manifest and copying the retrieved file or registry key to the file system or registry database of the computing device in place of the corresponding file or registry key with the different version; and for any file or registry key that is identified in an entry in the local manifest but is not identified in an entry in the reference device manifest, deleting the file or registry key from the file system or registry database of the computing device.

* * * * *